US007096553B1

(12) United States Patent
Carruth

(10) Patent No.: US 7,096,553 B1
(45) Date of Patent: Aug. 29, 2006

(54) PISTON RING SIZING DEVICE

(75) Inventor: Brain C. Carruth, Burbank, OH (US)

(73) Assignee: Autosales, Incorporated, Tallmadge, OH (US)

( * ) Notice: Subject to any disclaimer, the term of this patent is extended or adjusted under 35 U.S.C. 154(b) by 179 days.

(21) Appl. No.: 10/822,278

(22) Filed: Apr. 12, 2004

(51) Int. Cl.
*B25B 27/14* (2006.01)
*G01M 19/00* (2006.01)
*G01D 21/00* (2006.01)

(52) U.S. Cl. ........................ 29/271; 29/407.05; 33/605

(58) Field of Classification Search ............. 29/407.05, 29/271; 33/605, DIG. 17
See application file for complete search history.

(56) References Cited

U.S. PATENT DOCUMENTS

| | | | | |
|---|---|---|---|---|
| 3,287,812 A * | 11/1966 | Smith | .......................... | 33/796 |
| 5,038,449 A * | 8/1991 | Huggins, Jr. | ................. | 29/271 |
| 6,421,930 B1 * | 7/2002 | Foster | ......................... | 33/605 |
| 6,594,915 B1 * | 7/2003 | Matsumiya et al. | .......... | 33/783 |

OTHER PUBLICATIONS

Childs & Albert Piston Ring Squaring Tool, 1 page (undated).
Tavia Performance Specialty Tool & Accessories Piston Ring Squaring Tools, 1 page (Jan. 27, 2004).

* cited by examiner

*Primary Examiner*—David P. Bryant
*Assistant Examiner*—Christopher M. Koehler
(74) *Attorney, Agent, or Firm*—Renner, Kenner, Greive, Bobak, Taylor & Weber

(57) ABSTRACT

A device (10) adapted to position a ring (R) in the bore (B) of a cylinder (C) so that the ring (R) is perpendicular to the axis of the cylinder (C) includes a first segment (11) and a second segment (12). The first segment (11) has a tongue (20) which is slidably received in a groove (34) in the second segment (12). A threaded shaft (37) of a hand screw (35) is received through the groove (34) and into a threaded aperture (21) in the tongue (20) to attach the first segment (11) to the second segment (12). Arcuate surfaces (18) and (27) of the first and second segments (11, 12), respectively, define a portion of the circumference of a circle approximately the diameter of the bore (B) when the segments (11, 12) are attached to each other. The ring (R) is positioned in the bore (B) and the device (10) is inserted in the bore (B) until the lip (19, 28) of the first and second segments (11, 12) rest on the top edge of the cylinder (C). The bottom (41) of the surfaces (18, 27) thus push against the ring (R), and because the surfaces (18, 27) are the same height, the ring (R) is positioned perpendicularly to the axis of the cylinder (C) so that the gap (G) between the ends of the ring (R) can be accurately measured.

4 Claims, 3 Drawing Sheets

PISTON RING SIZING DEVICE

TECHNICAL FIELD

The present invention relates to a device, and its method of operation, for accurately measuring the size of the gap between the ends of a piston ring. More particularly, this invention relates to such a device which is adjustable so that rings for a wide range of cylinder bore sizes can be accurately measured.

BACKGROUND ART

Generally, there are three piston rings used in a cylinder of an internal combustion engine: the top ring, the second ring, and the oil ring. The three piston rings are positioned around a piston which reciprocates within the cylinder. The top ring, the second ring, and the oil ring are respectively spaced in vertically descending order around the walls of the piston The combination of all three piston rings serves to isolate the combustion chamber from the crankcase.

The top ring serves two purposes: preventing gases (from the combustion chamber) from passing therearound, and transferring heat from the piston to the engine block through the walls of the cylinder. The oil ring prevents oil (from the crankcase) from passing therearound. The second ring compliments both the top ring and the oil ring. The second ring prevents gases (which bypassed the top ring) from passing therearound, and prevents oil (which bypassed the oil ring) from passing therearound. Consequently, the top ring, the second ring, and the oil ring are seals for preventing the passage of gases and/or oil. Without the isolation of the combustion chamber and the crankcase provided by the piston rings, the presence of gases in the crankcase and oil in the combustion chamber would decrease the horsepower of the internal combustion engine.

To serve as seals, the top ring and second ring springingly engage the walls of the cylinder. For example, in the "free state" before installation, the top ring and second ring are biased to expand. That is, the top ring and second ring have expanded diameters forming a gap between their respective ends. When the top ring and second ring are installed around the piston, the ends of each ring are squeezed together. Thereafter, the piston and the surrounding rings are inserted into the cylinder. Because each ring is biased to expand toward its "free state," the top ring and the bottom ring expand against the walls of the cylinder. As such, the top ring and the bottom ring springingly engage the walls of the cylinder, and serve to effectuate the above-discussed seal between the combustion chamber and the crankcase.

For normal use, it is generally unnecessary to "fit" the gaps between the ends of the top ring and the second ring to precise tolerances. However, for high performance/racing applications, fitting the gaps can be used to provide a competitive advantage. For example, the top rings and the second rings used in racing applications are often sold with oversized dimensions, and, therefore, provide small gaps between their ends. Consequently, before installation, the ends of the top rings and second rings can be filed and refiled to provide gaps of different sizes. Such different sized gaps provide for different separations between the ends when the piston rings are installed.

The filing and refiling allows the performance of the various gap sizes (and corresponding separations) to be tested, and such experimentation can enhance the performance of an internal combustion engine. For example, because internal combustion engines used in racing operate at high temperatures, it is necessary to provide a gap allowing for expansion of the piston rings according to the high temperatures. Thus, a properly sized gap would allow the ends to be initially separated when the piston rings are inserted into the cylinder, which separation could thereafter close when the piston rings expand due to exposure to high temperatures.

However, if the gaps are sized too small, the ends will close before the piston rings are finished expanding, and the piston rings will warp, thereby causing "scuffing" of the walls of the cylinder. Moreover, if the ends are misaligned, the ends will touch unevenly, which will not only cause unwanted separation therebetween before the piston rings are finished expanding, but which might also force the piston rings to expand awkwardly, thereby also causing "scuffing" of the walls of the cylinder. Consequently, the gaps must be precisely sized, and the ends must be properly aligned with respect to one another.

Thus, the user must first measure the gap between the ends of the ring and then, assuming that the gap is too small, must then grind the ends of the ring in an attempt to obtain the desired gap. A typical desired gap is 0.003 inch per inch of diameter of the cylinder, and as a result of working with such a precise number, oftentimes the measuring/grinding steps are repeated many times until the precise desired gap is obtained.

One of the problems with this procedure is the manner in which accurate measurements can be obtained so that the user knows how much grinding might be required and also knows when he has completed the project with the gap being at the desired size. One method of measuring the gap would be to insert the ring in a bore and attempt to measure the size of the gap. However, the user could never be certain whether the ring was perfectly perpendicular to the axis of the bore, because if it would not be perpendicular, it would be canted and inaccurate measurements would be obtained.

In an attempt to solve this problem, a device known as a squaring tool has been developed. This device consists of a ring of a known diameter (simulating the diameter of a piston) having a shoulder extending outwardly therefrom. The piston ring to be sized is placed around the ring and on the shoulder, and the gap may be measured. However, such a device is only good for one size of a cylinder bore, and since the diameter of the bores of typical cylinders range from 3.75 inches to 4.65 inches, numerous sizing rings encompassing a wide variety of piston diameters would have to be inventoried by the user.

As a result, the need exists for a device which can assist the user in accurately measuring, or otherwise checking, the size of the gap of a piston ring for a wide range of cylinder bore diameters.

DISCLOSURE OF THE INVENTION

It is thus an object of the present invention to provide a device, and its method of operation, which can be utilized to measure the gap between the ends of a piston ring.

It is another object of the present invention to provide a device, as above, which can be utilized to measure such gaps in rings adapted to be used in a wide variety of cylinder bore diameter sizes.

These and other objects of the present invention, as well as the advantages thereof over existing prior art forms, which will become apparent from the description to follow, are accomplished by the improvements hereinafter described and claimed.

In general, a device made in accordance with the present invention is adapted to position a ring in a cylindrical bore of a cylinder so that the ring is perpendicular to the axis of the bore. The device includes a first segment having a tongue and a second segment having a groove adapted to receive the tongue. The tongue is held in the groove at a predetermined position dependent on the diameter of the bore. The first and second segments have surfaces of the same height which are received within the bore so that the bottom of the surfaces engage the ring to position the ring perpendicular to the axis of the bore.

The method of the present invention enables one to establish the size of the gap between the ends of a split ring which is adapted to be positioned in the bore of a cylinder using a device having two segments. The method includes the steps of adjusting the position of the segments relative to each other dependent on the diameter of the bore, placing the ring in the bore, positioning the device in the bore, and pressing the device downwardly on the ring to position the ring in the bore perpendicularly to the axis of the cylinder.

A preferred exemplary device for checking the end gap in a piston ring according to the concepts of the present invention is shown by way of example in the accompanying drawings without attempting to show all the various forms and modifications in which the invention might be embodied, the invention being measured by the appended claims and not by the details of the specification.

PREFERRED EMBODIMENT FOR CARRYING OUT THE INVENTION

Figure 1:
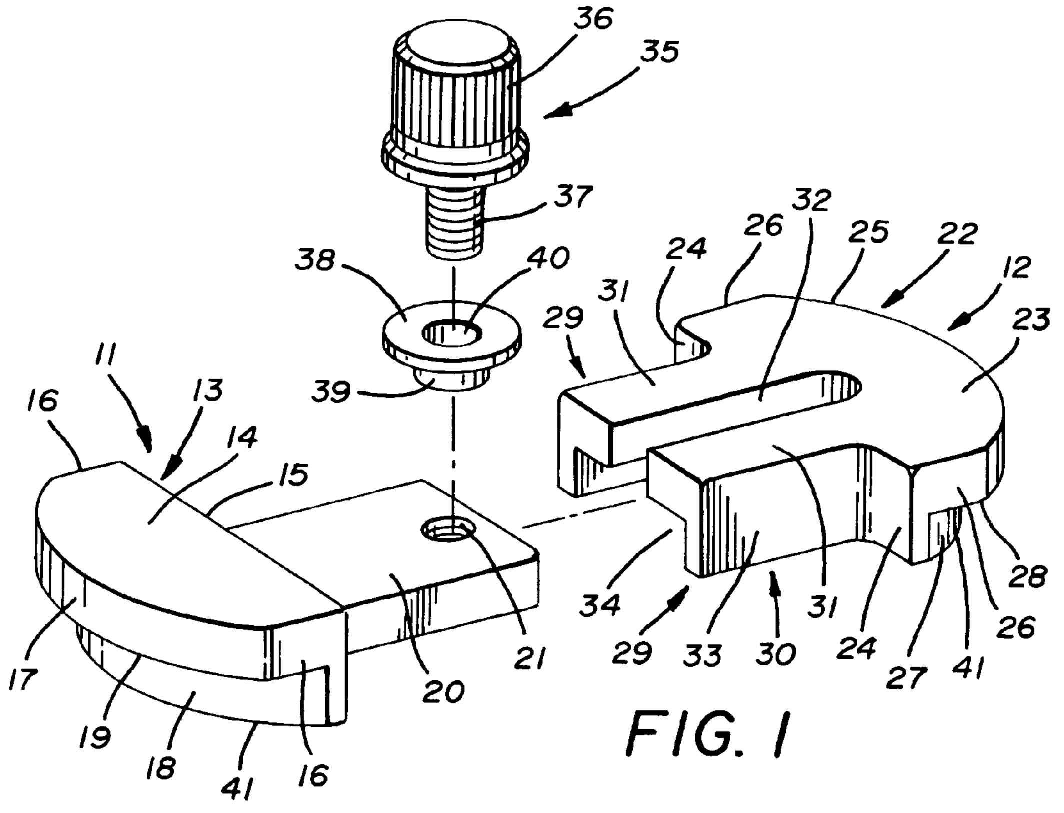
FIG. 1 is an exploded perspective view of a device made in accordance with the present invention.

A device for checking the end gap in a piston ring is indicated generally by the numeral 10. Device 10 is preferably made of an aluminum material and includes a first segment, generally indicated by the numeral 11, and a second segment generally indicated by the numeral 12.

Segment 11 includes a body portion, generally indicated by the numeral 13, which has an upper surface 14, an inner planar surface 15, opposed side edges 16 and an upper arcuate surface 17 opposing surface 15 and defining a portion of a circle. Body portion 13 also includes a lower arcuate surface 18 generally parallel to surface 17 and likewise defining a portion of a circle. Surface 17 extends further outward from surface 15 than does surface 18, thereby defining a lip 19 which opposes upper surface 14 and which overhangs lower arcuate surface 18. A generally rectangular tongue 20 extends from body portion 13 below surface 15. Tongue 20 includes a threaded aperture 21 near the end thereof opposite to body portion 13.

Segment 12 includes a body portion, generally indicated by the numeral 22, which at its outer end is configured much like body portion 13 of segment 11. As such, the outer end of body portion 22 includes an upper surface 23, inner planar surfaces 24, an upper arcuate surface 25 generally defining a portion of a circle, and opposed side edges 26 extending between the ends of arcuate surface 25 and inner surfaces 24. Body portion 22 also includes a lower arcuate surface 27 generally paralleling surface 25 and likewise defining a portion of a circle. Surface 27 and surface 18 are of the same height. Surface 25 extends further outward than surface 27, thereby defining a lip 28 which opposes upper surface 23 and which overhangs arcuate surface 27. A tongue receiver assembly, generally indicated by the numeral 29 extends from body portion 22 and includes opposed forks, generally indicated by the numeral 30, having top surfaces 31 separated by a slot 32. Forks 30 include side surfaces 33 generally merging with inner surfaces 24 of body portion 22. Forks 30 together form a tongue receiving groove 34 which communicates with slot 32. Groove 34 is thus configured to receive tongue 20 as now will be described.

Figure 2:
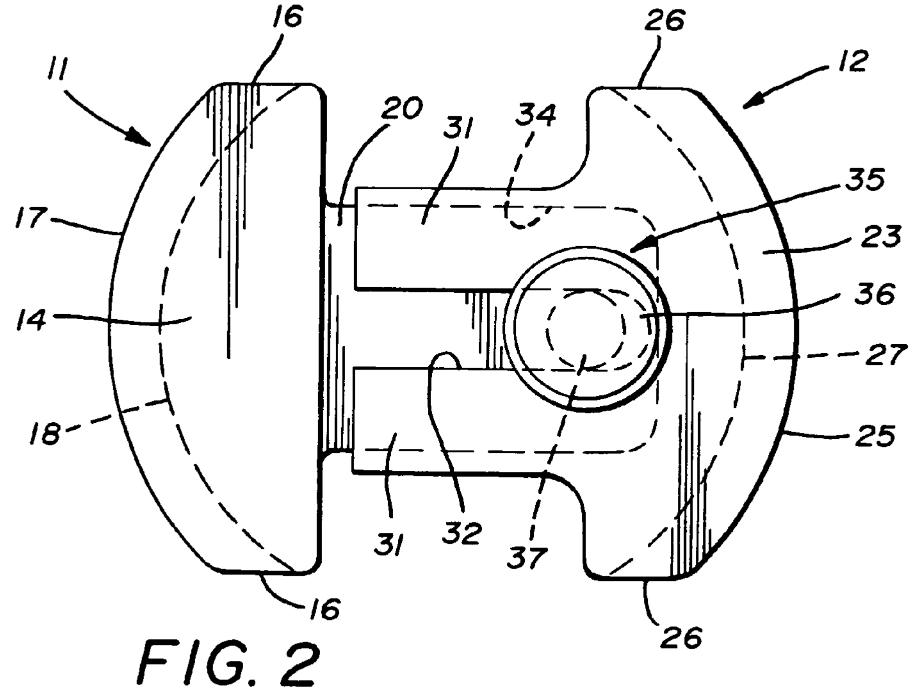
FIG. 2 is a top plan view of the device assembled and in a condition to measure a ring for a smaller size cylinder bore.
Figure 3:
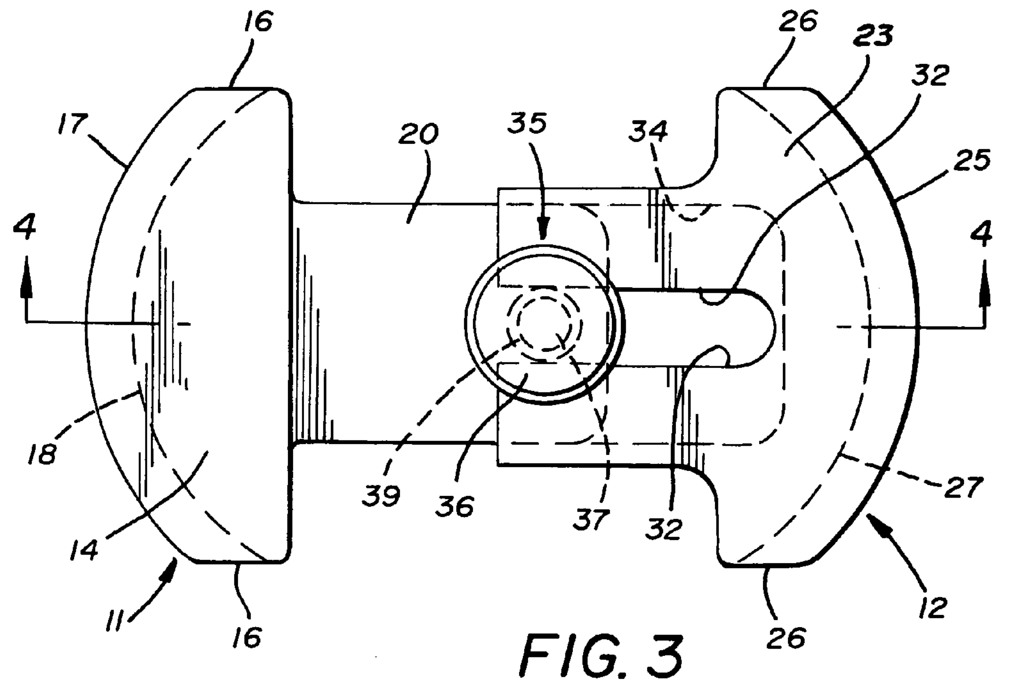
FIG. 3 is a view similar to FIG. 2 but showing the device adjusted so as to be in a condition to measure a ring for a larger size cylinder bore.
Figure 4:
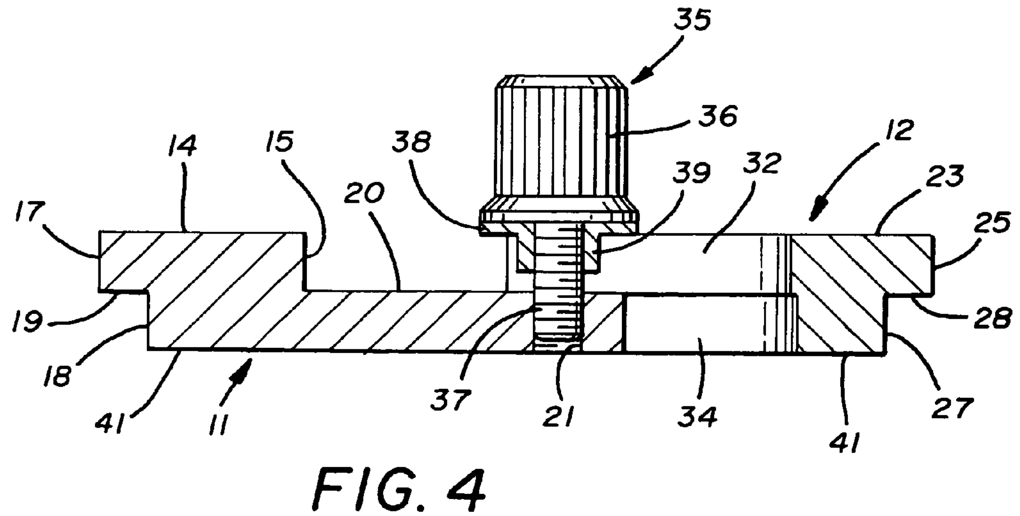
FIG. 4 is a sectional view taken substantially along line 4—4 of FIG. 3.

The relative position of segment 11 and segment 12, and thus the effective diameter of a circle defined by arcuate surfaces 18 and 27, can be adjusted dependent on how far tongue 20 is slid into groove 34. For example, FIG. 2 shows tongue 20 substantially completely within groove 34 with surfaces 18 and 27 thus defining approximately the smallest diameter provided by device 10, and FIG. 3 shows tongue 20 only slightly within groove 34 with surfaces 18 and 27 thus defining approximately the largest diameter provided by device 10. These positions of segments 11 and 12, and any position therebetween, is maintained by a hand screw generally indicated by the numeral 35. Hand screw 35 includes a knurled head 36 and a threaded shaft 37. A plastic shoulder washer 38 includes a stub shaft 39 which is received in slot 32 above the location of aperture 21 which depends, of course, on how far tongue 20 is received within groove 34. Then threaded shaft 37 is slidably received through an aperture 40 in washer 38 and is threaded into aperture 21 to hold segment 11 relative to segment 12 at the desired location. Knurled head 36 assists the user in assuring a tight connection, and the plastic shoulder washer 38 protects the aluminum upper surface 23 of body portion 22 of segment 12.

Figure 5:
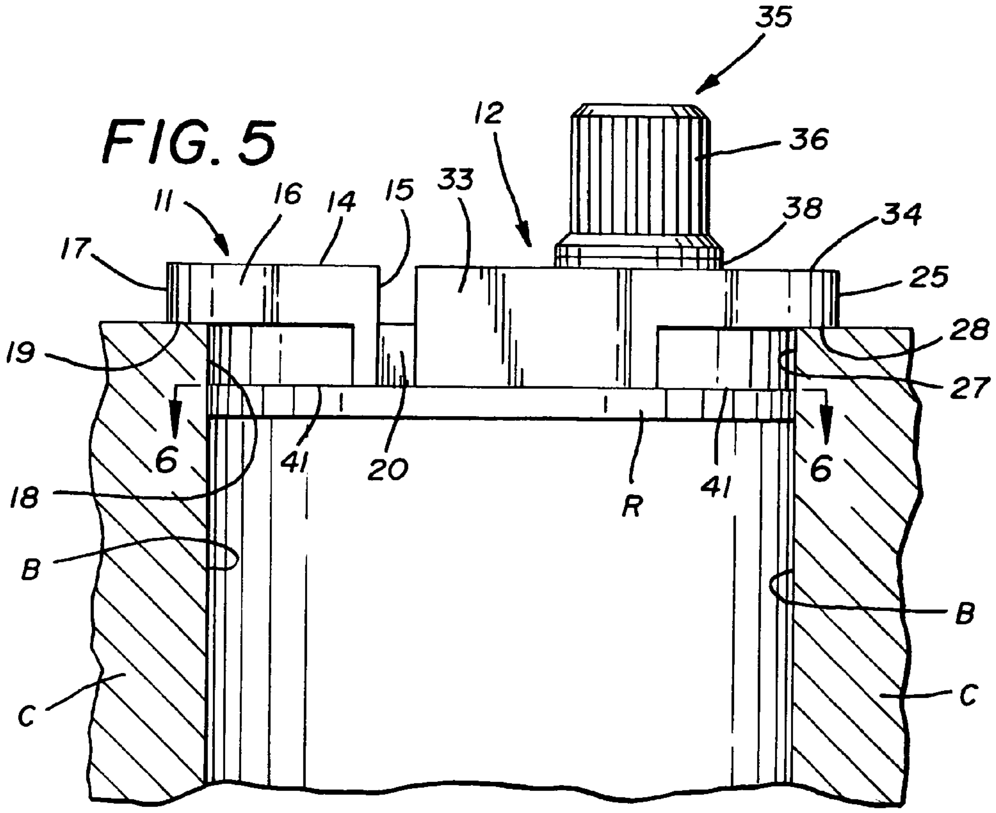
FIG. 5 is a view depicting the manner in which the device is used to assist the user in ascertaining the size of the gap between the ends of a piston ring.
Figure 6:
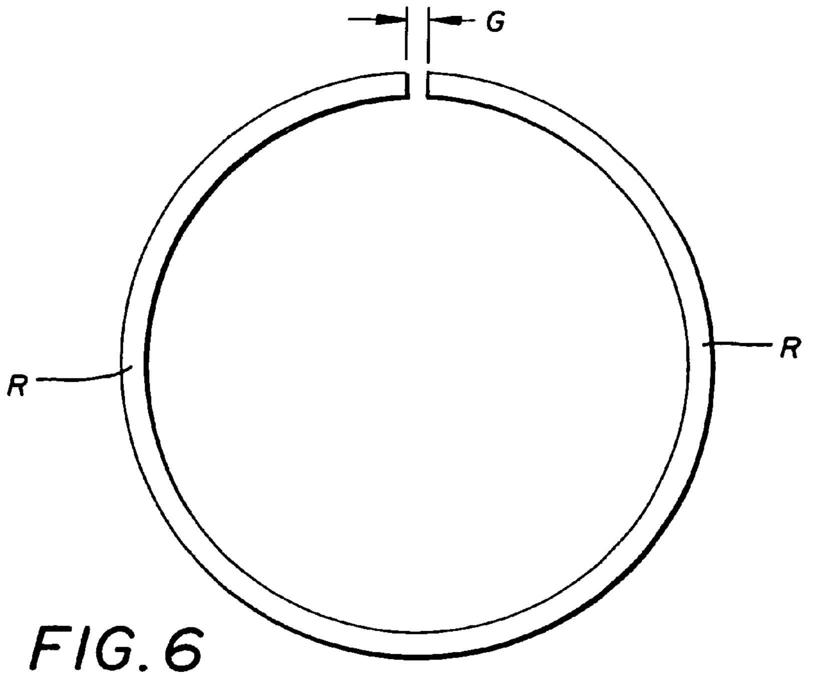
FIG. 6 is a plan view of a piston ring taken substantially along line 6—6 of FIG. 5.

The manner in which device 10 is used to check the end gap in a piston ring is best shown in FIG. 5. There, a cylinder C having a bore B is shown. A split piston ring R has a gap G (FIG. 6) between its ends. As previously discussed, device 10 is adapted to be used to check gaps G in rings R for use in a wide variety of cylinders C having bores B of different diameters. For example, as previously described, bores B can typically range in diameter from 3.75 inches to 4.65 inches.

To use device 10, ring R is first put in bore B, near the top thereof. As previously described, in the prior art, if this procedure were attempted, somehow the user would have to assure that the ring R was not canted, that is, was perfectly perpendicular to the axis of cylinder C. The device 10 of the present invention solves that problem. In order to operate device 10, first the size of device 10 is adjusted, as previously described, so that its effective diameter, as defined by arcuate surfaces 18 and 27, is equal to the diameter of bore B to the extent that it will fit therein, as shown in FIG. 5. When device 10 is thus inserted into bore B, it is pushed downwardly until lips 19 and 28 rest on top of the top edge of cylinder C. As such, the bottom surfaces 41 of surfaces 18 and 27 of device 10 push ring R uniformly downwardly in bore B so that it is positioned perpendicular to the axis of cylinder C. At such time, ring R is in a condition that it would be in if positioned in the groove of a piston, and the gap G can be measured. As earlier described, a typical desired gap G is, for example, 0.003 inch per inch of diameter of cylinder bore B. Thus, if bore B is of a four inch diameter, a desired ring gap G would be 0.012 inch. Thus, if after using device 10, a gap G of 0.010 inch, for example, were measured, the user would know that he would have to grind 0.002 inch from the ring R to arrive at the desired gap G. Of course, after grinding ring R a small amount, the use of device 10 can be repeated to measure gap G until ring R has been ground to achieve the desired gap G.

It should be evident that a device constructed as described herein accomplishes the objects of the present invention and otherwise substantially improves the art.

What is claimed is:

1. A device adapted to position a ring in a cylindrical bore of a cylinder so that the ring is perpendicular to the axis of the bore comprising a first segment having a tongue, a second segment having a groove adapted to receive said tongue, said tongue being held in said groove at a predetermined position dependent on the diameter of the bore, said first and second segments each having a surface adapted to be received within the bore, said surfaces being of the same height so that when positioned in the bore, the bottom of said surfaces engage the ring to position the ring perpendicular to the axis of the bore, and means to attach said first segment to said second segment, wherein said means include a hand screw having a threaded shaft, wherein said second segment includes a slot communicating with said groove and said tongue includes a threaded aperture, said threaded shaft being received through said slot to engage said threaded aperture.

2. The device of claim 1 wherein said surfaces of said first and second segments are arcuate and together define a portion of the circumference of a circle the size of which is dependent on the relative position of said tongue in said groove.

3. The device of claim 1 wherein said first and second segments each include a lip above said surfaces, said lip being adapted to rest on the top edge of the cylinder.

4. The device of claim 1 wherein said means further include a shoulder washer having a stub shaft, said stub shaft being received in said slot and said threaded shaft being received through said stub shaft.

* * * * *